United States Patent
Busley et al.

(10) Patent No.: US 10,562,573 B2
(45) Date of Patent: *Feb. 18, 2020

(54) ROAD CONSTRUCTION MACHINE, CRAWLER TRACK UNIT OF A ROAD CONSTRUCTION MACHINE, AS WELL AS METHOD FOR TENSIONING A CHAIN OF A CRAWLER TRACK UNIT

(71) Applicant: Wirtgen GmbH, Windhagen (DE)

(72) Inventors: Peter Busley, Linz/Rhein (DE); Burkhard Frank, Vetterschoss (DE); Cyrus Barimani, Königswinter (DE)

(73) Assignee: Wirtgen GmbH (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/691,705

(22) Filed: Apr. 21, 2015

(65) Prior Publication Data

US 2015/0329158 A1    Nov. 19, 2015

Related U.S. Application Data

(63) Continuation of application No. 12/725,597, filed on Mar. 17, 2010, now Pat. No. 9,016,810.

(30) Foreign Application Priority Data

Mar. 20, 2009    (DE) .......... 10 2009 013 708

(51) Int. Cl.
   *B62D 55/065*    (2006.01)
   *B62D 55/30*    (2006.01)

(52) U.S. Cl.
   CPC ....... *B62D 55/065* (2013.01); *B62D 55/0655* (2013.01); *B62D 55/30* (2013.01); *B62D 55/305* (2013.01)

(58) Field of Classification Search
   CPC .. B62D 55/065; B62D 55/0655; B62D 55/30; B62D 55/305
   (Continued)

(56) References Cited

U.S. PATENT DOCUMENTS

| | | |
|---|---|---|
| 3,511,327 A | 5/1970 | Schlör |
| 3,647,270 A | 3/1972 | Althaus |

(Continued)

FOREIGN PATENT DOCUMENTS

| | | |
|---|---|---|
| DE | 9310662 U1 | 12/1993 |
| DE | 4407764 A1 | 9/1994 |

(Continued)

OTHER PUBLICATIONS

European Search Report in European Patent Application EP 10156603, dated Sep. 8, 2014, 3 pp (not prior art).

*Primary Examiner* — Jason R Bellinger
(74) *Attorney, Agent, or Firm* — Lucian Wayne Beavers; Patterson Intellectual Property Law, PC

(57) ABSTRACT

A road construction machine includes a machine frame and two front and two rear crawler track units. Each crawler track unit includes a piston-cylinder unit. A central pressure limiting valve communicates a hydraulic pressure source with a hydraulic supply line. The hydraulic supply line communicates the central pressure limiting valve with the piston-cylinder units of all four crawler tracks. A common pressure accumulator is communicated with all four of the piston-cylinder units.

19 Claims, 3 Drawing Sheets

(58) Field of Classification Search
USPC .............. 305/125, 127, 130, 143–147, 149
See application file for complete search history.

(56) References Cited

U.S. PATENT DOCUMENTS

| | | |
|---|---|---|
| 3,901,563 A | 8/1975 | Day |
| 3,972,569 A | 8/1976 | Bricknell |
| 4,149,757 A | 4/1979 | Meisel, Jr. |
| 4,893,883 A | 1/1990 | Satzler |
| 5,005,920 A | 4/1991 | Kinsinger |
| 5,738,421 A | 4/1998 | Helmut |
| 6,224,172 B1 | 5/2001 | Goodwin |
| 6,249,994 B1 | 6/2001 | Oertley |
| 6,276,768 B1 | 8/2001 | Miller |
| 6,322,171 B1 | 11/2001 | Fornes |
| 6,336,690 B2 | 1/2002 | Toms et al. |
| 6,354,678 B1 | 3/2002 | Oertley |
| 7,914,087 B2 | 3/2011 | Alfthan |
| 9,016,810 B2 * | 4/2015 | Busley ................ B62D 55/065 305/125 |
| 2003/0117017 A1 | 6/2003 | Hoff |

FOREIGN PATENT DOCUMENTS

| | | |
|---|---|---|
| DE | 10257405 A1 | 7/2003 |
| FR | 1550008 A | 12/1968 |
| JP | H0872761 A | 3/1996 |
| JP | 8282560 A | 10/1996 |
| JP | 2006143046 A | 6/2006 |
| JP | 2007015560 A1 | 1/2007 |
| WO | 0156867 A1 | 8/2001 |

* cited by examiner

ROAD CONSTRUCTION MACHINE, CRAWLER TRACK UNIT OF A ROAD CONSTRUCTION MACHINE, AS WELL AS METHOD FOR TENSIONING A CHAIN OF A CRAWLER TRACK UNIT

This application claims priority from German Patent Application No. 10 2009 013 708.4 filed Mar. 20, 2009.

BACKGROUND OF THE INVENTION

1. Field of the Invention

The invention relates to a road construction machine, in particular a road milling machine, a crawler track unit for a road construction machine, as well as a method for tensioning a chain of a crawler track unit.

2. Description of the Prior Art

Tracked vehicles are provided with a chassis with several crawler track units, said chassis carrying the machine frame.

A crawler track unit is comprised of the following elements:
 a chain with an upper strand and a lower strand made of metal, or with additional track pads for road operation,
 a drive wheel, which transfers the torque from a drive engine to the chain,
 a guide wheel, which is preferably provided with an adjustment device enabling the reciprocal spacing of the axles of the drive wheel and guide wheel to be adjusted for adaptation to a current length of the chain,
 track rollers, which carry the machine frame and roll on the chain,
 possibly additional support rollers, which support the return movement of the upper strand of the chain,
 where, in addition to the adjustment device, a spring element may be provided which allows, using the adjusted spacing between the axles of the drive wheel and guide wheel as a basis, the spacing to be shortened against the spring force in the event of an operation-related increase of the chain tension to prevent any tension peaks in the chain.

In a crawler track unit, the drive wheel is normally located in the rear position when seen in the direction of travel, so that the lower strand of the chain is subject to tensile stress. In this arrangement, returning of the chain under load causes increased wear of the chain.

To adjust the required chain tension, which enables low chain wear on the one hand and prevents the chain from disengaging on the other, it has to date been known to use a chain tensioning device consisting of a grease tensioner in combination with a spring element. The spring element enables the spacing between the axles of the drive wheel and guide wheel to be shortened in the event of an operation-related increase of the chain tension to prevent any tension peaks in the chain. The grease tensioner uses essentially incompressible grease and serves to adjust the reciprocal spacing of the axles of the drive wheel and guide wheel for adaptation to a current length of the chain. This means that, when the chain has lengthened, a compensation for the change in length is effected via the grease tensioner, where the slack of the chain is determined first and then grease is fed manually via the grease tensioner until the chain shows a desired slack.

It is of disadvantage in this design that these adjustment procedures are performed manually and need to be carried out separately for each crawler track unit of a tracked vehicle, which results in a significant loss of time.

It is of disadvantage in this design also that these manual maintenance procedures are frequently performed too infrequently or even too frequently.

If the maintenance procedures are performed too infrequently, there is the risk that the chain may disengage or may be subject to excessive wear. If the maintenance procedures are performed too frequently, the resulting loss of time is of disadvantage. Apart from that, performing the maintenance procedures manually also involves the risk of mistakes frequently being made when measuring the chain slack.

Another possibility is to control the chain tension, for instance, purely hydraulically, where an additional spring element is not normally provided in such systems. A piston-cylinder unit keeps the chain permanently tensioned. When the crawler track unit drives over an obstacle (as an example of an operation-related increase of the chain tension), a pressure-limiting valve connected to the cylinder of the piston-cylinder unit can release pressure, in which case the piston retracts.

It is of disadvantage in this design that the permanent, relatively high chain tension results in an increase of chain wear. The high degree of wear is caused by the requirement of an increased feed pressure being permanently available which causes the piston to extend again after deflection on account of an operation-related increase of the chain tension. A problem also exists during reverse travel, as the chain may easily disengage during deflection of the guide wheel. In reverse travel, the chain tension extends across the upper strand of the chain and across the guide wheel, lessening only on the lower side in the load strand. If pressure is then released by the pressure-limiting valve as a result of an overload situation, there is the risk of the chain disengaging.

A chain tensioning system for a chain of a crawler track unit is described in DE 102 57 405 A1 and U.S. 2003/0117017, by means of which a relatively high chain tension is maintained in an excavator during operation. This arrangement prevents the excavator from rolling backwards or rolling forwards on the chain when in operation.

If the excavator is merely moved without being in operation, however, the chain tension is reduced in order to reduce the wear of the crawler track unit.

SUMMARY OF THE INVENTION

It is the object of the invention to create a road construction machine with a chain tensioning device, a crawler track unit, as well as a method for tensioning a chain of a crawler track unit, which enable a desired slack of the empty strand of the chain to be adjusted automatically without requiring maintenance work on the crawler track units.

The invention provides in an advantageous manner that the adjustment device comprises a piston-cylinder unit to which a preferably hydraulic operating pressure can be applied in order to generate a predetermined force of the piston, and that a locking device locks the end position of the piston of the piston-cylinder unit reached under the operating pressure applied.

The invention enables a desired slack of the chain in its upper empty strand to be adjusted automatically prior to an operation of the construction machine by generating a piston force of the adjustment device which is correlated with a certain chain tension, and by locking the end position of the piston in a permanent fashion by means of the locking device. The reciprocal spacing of the axles of the drive wheel and guide wheel is thus adapted to a current length of the chain and is permanently adjusted without adversely affecting the mode of operation of the spring element acting in series to the adjustment device.

The end position of the piston reached is preferably locked upon reaching a counterforce between the axles of the drive wheel and guide wheel which essentially equals the force of the piston. Alternatively, the end position of the piston reached may also be locked after a predetermined time lapse from pressurization of the adjustment device, or after a predetermined slack of the chain in the upper strand has been reached.

Adjustment of the chain tension, or of the slack respectively, can be performed during every break in operation or downtime of the machine, at each initial start of operation on a day, or else in smaller and larger time intervals.

It may also be provided that the adjustment of the chain tension, or of the slack respectively, is automated and is performed after every break in operation or downtime of the machine, possibly in connection with the lapse of predetermined time intervals, or at every initial start of operation.

It is preferably provided that the prestressed spring element is arranged between the piston of the piston-cylinder unit and the axle of the drive wheel or guide wheel. In this embodiment, it is provided that the spring element is arranged between the piston of the adjustment device, which is immovable after adjustment of the chain tension, and the axle of the drive wheel or preferably of the guide wheel.

A preferred embodiment provides that the same amount of predetermined operating pressure is applied to the adjustment devices of all crawler track units. It is thus ensured that all crawler track units are operated with the same amount of chain tension and with the same amount of desired slack.

The cylinders of the adjustment devices of all crawler track units may be provided, independently of one another, with a pressure accumulator that provides the operating pressure applied.

It may also be provided that the cylinders of the adjustment devices of all crawler track units are interconnected. It is thus ensured that the same amount of force acts on all pistons of the adjustment devices, and that the same amount of chain tension is adjusted for all crawler track units after locking of the end position of the piston.

An additional advantage is that the cylinders can communicate among each other so that, for instance, a pressure peak in one cylinder can be compensated, at least partially, by the other three cylinders.

The cylinders of the adjustment devices of all crawler track units, which are connected in parallel, may also be provided with a common pressure accumulator.

A pressure accumulator which is partially filled with gas, for instance, offers the advantage that tension peaks in individual cylinders can be counterbalanced in a more flexible fashion.

It is preferably provided that a central pressure-limiting valve provides the operating pressure for the cylinders of the adjustment devices of all crawler track units to adjust the desired chain tension. Such a pressure-limiting valve, which is arranged upstream of the locking device, limits the operating pressure. Being able to maintain the same amount of chain tension in all crawler track units also ensures that all crawler track units are subject to the same amount of wear.

In accordance with the method according to the present invention, it is provided in an advantageous manner that the axle spacing between the axles of the drive wheel and guide wheel is adjusted, prior to an operating stage of the tracked vehicle, by applying a preferably hydraulic operating pressure to a piston-cylinder unit to generate a predetermined force of the piston, said force corresponding to a desired slack in the upper empty strand of the chain, where the end position of the piston of the piston-cylinder unit reached is locked.

Locking of the end position of the piston and thus securing of the spacing between the axles of the drive wheel and guide wheel is effected, for instance, upon reaching a balance between the force of the piston and the force resulting from the chain tension, or after the lapse of a scheduled time of action of the piston force, or upon reaching a predetermined slack.

A progressive compression spring, which is prestressed, may be used as a spring element.

The reciprocal spacing between the axles of the drive wheel and guide wheel is thus adapted to a current lengthening of the chain and adjusted statically, and can be maintained until a further adaptation to a current lengthening of the chain is deemed necessary.

It is preferably provided that the spring element is arranged in series to the piston-cylinder unit, and that the position of the piston is locked when the piston force equals the counterforce resulting from the chain tension.

BRIEF DESCRIPTION OF THE DRAWINGS

In the following, one embodiment of the invention is explained in greater detail with reference to the drawings. The following is shown.

DETAILED DESCRIPTION

Figure 1:
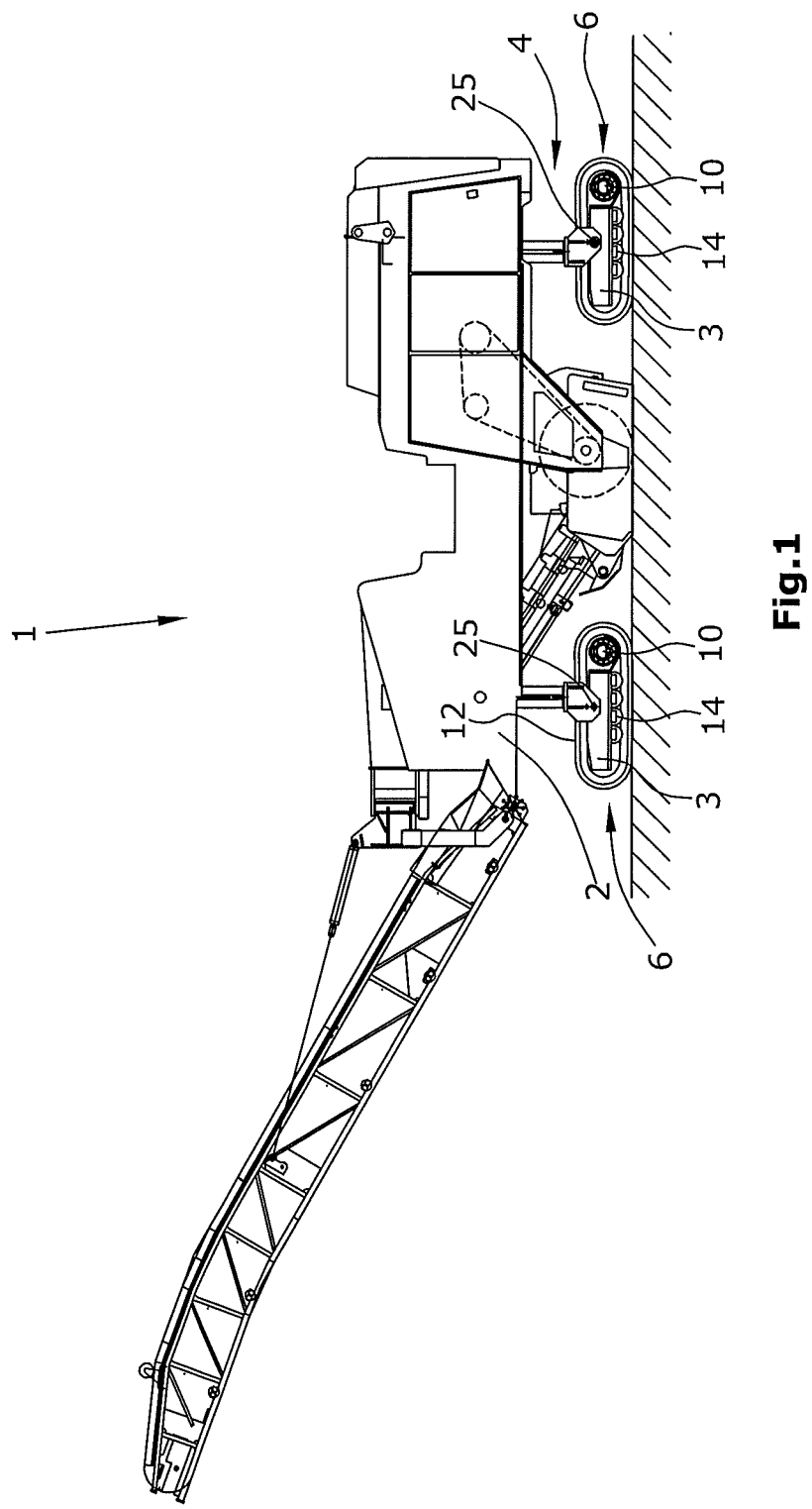
FIG. 1 a tracked vehicle in the form of a road milling machine with a total number of four crawler track units, FIG. 2 schematic side view of a crawler track unit with chain tensioning device, and FIG. 3 a hydraulic circuit diagram of the chain tensioning device in a tracked vehicle with four crawler track units.

FIG. 1 shows a road milling machine 1 with a machine frame 2 and a chassis 4 with four crawler track units 6, said chassis 4 carrying the machine frame 2. The crawler track units 6 are provided with a continuously revolving chain 12 which may be provided with plastic track pads in order to prevent any damage to the road pavement.

The chain 12 continuously revolves around at least one guide wheel 8 and at least one drive wheel 10, which is provided with a preferably hydraulic drive 11. The machine frame 2 is carried by track rollers 14 which roll on the inside of the chain 12.

The reciprocal spacing of the axle 20 of the guide wheel 8 and the axle 22 of the drive wheel 10 is adjustable by means of an adjustment device 18 for adaptation to a current length of the chain 12. In addition to the adjustment device 18, a spring element 24 is provided that is arranged in series with the adjustment device 18, where the spring element 24 enables, using the adjusted spacing between the axles 20,22 as a basis, a momentary shortening of the spacing between the axles 20,22 against the spring force in the event of an operation-related increase of the chain tension to prevent any tension peaks in the chain 12. Such tension peaks may occur, for instance, when the tracked vehicle 1 drives over obstacles.

The crawler track unit 6 is pivotable about a preferably essentially centrally arranged pendulum bolt 25 about a horizontal axis in order to be able to adapt to uneven ground conditions or road conditions. A chassis frame 3 of the crawler track unit 6 is connected to the machine frame 2 of the tracked vehicle via the pendulum bolt 25, a console 23 supporting the pendulum bolt 25, and a lifting column 27.

Figure 2:
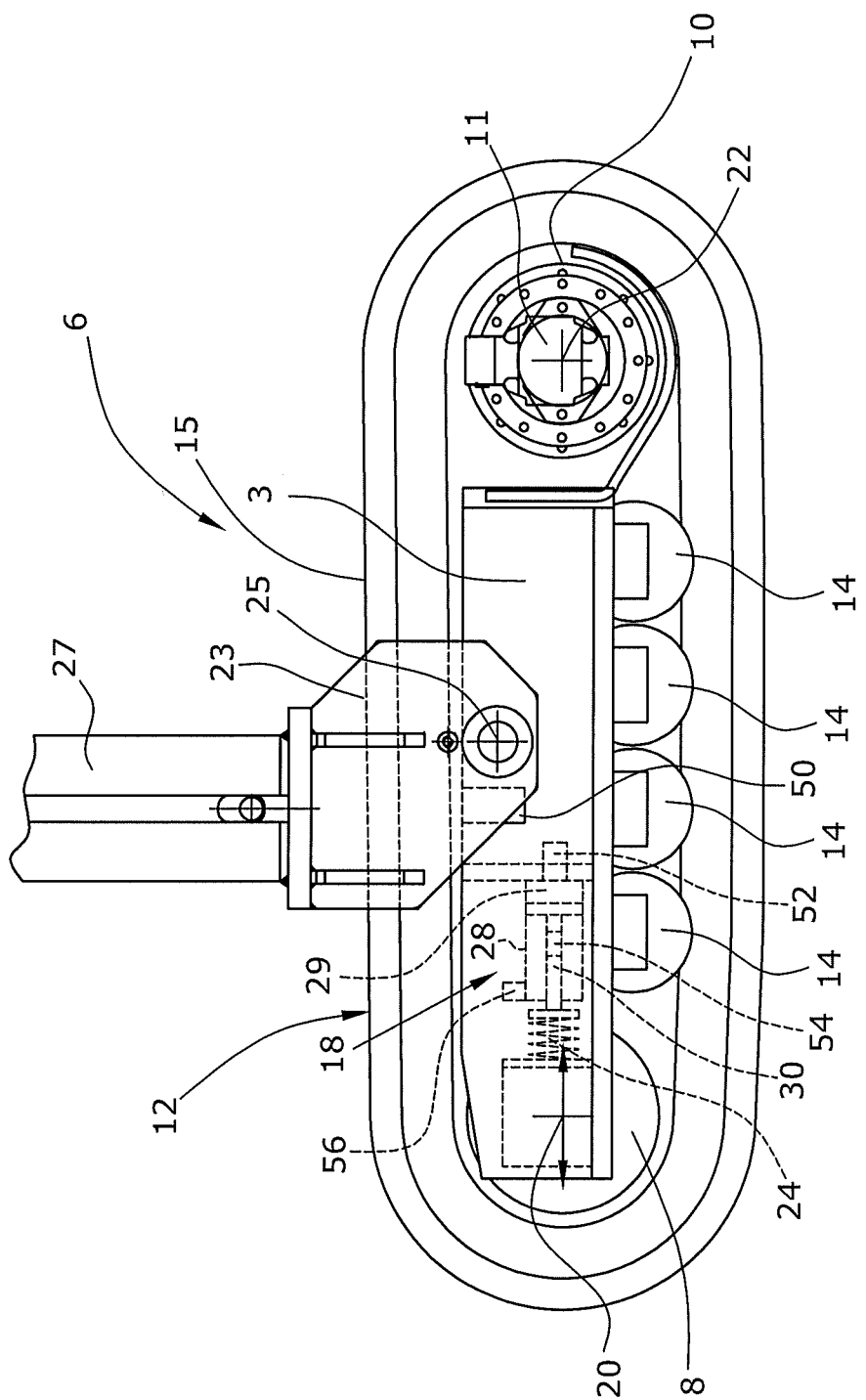

The adjustment device 18, as well as the spring element 24, are preferably arranged between the pendulum bolt 25 and the guide wheel 8. The proposed combination of an adjustment device 18 and a spring element 24 offers the advantage that a compact chain tensioning device can be created which is characterized by a low space requirement even with a small axle spacing between the axles 20, 22. The arrangement of the adjustment device 18 and the spring element 24 can be inferred, for example, from FIG. 2, with it being possible to also reverse the sequence of the adjustment device 18 and the spring element 24. The axle 20 of the guide wheel 8 is supported at the chassis frame 3 of the crawler track unit 6 in a fashion enabling it to be linearly moved in the direction of the arrow so that, in the event of an increase of the axle spacing between the axles 20,22, the chain tension of the chain 12 can be increased, thus enabling an adaptation to a possible lengthening of the chain to be effected.

The adjustment device 18 comprises a piston-cylinder unit 28 with a piston 30 to which a predetermined operating pressure can be applied in order to generate a predetermined force of the piston 30. In this arrangement, the operating pressure and the force of the piston 30 are calibrated to a desired chain tension, which leads to a desired slack of the chain 12 in the upper strand 15. When applying the preset operating pressure to the cylinder 29, the piston 30 keeps moving forward until the force of the piston 30 is in balance with the counterforce of the guide wheel 8 resulting from the chain tension, or until the force of the piston 30 has been able to act on the chain for a sufficient amount of time. To this effect, locking of the piston 30 may be effected after a preset time lapse.

The prestressed spring element 24 may enable, using the permanently adjusted spacing of the axles 20,22 as a basis, a shortening of the spacing between the axles in the event that a usually short-term operation-related significant increase of the chain tension should occur.

To prevent any tension peaks in the chain 12, the guide wheel 8 can accordingly deflect against the spring force of the spring element 24 in the direction of the adjustment device 18.

When, upon application of the operating pressure to the piston-cylinder unit 28, the piston 30 has reached an end position in which the force of the piston 30 is cancelled out by the essentially equally high counterforce of the guide wheel 8, or a predetermined slack of the chain 12 has been reached, or the force of the piston 30 has been able to act on the chain 12 for a sufficient amount of time, then the piston 30 can be locked in the end position reached by means of a locking device 34.

As the axle 22 of the drive wheel 10 is ultimately mounted at the chassis frame 3, any alteration of the position of the piston 30 of the adjustment device 18 fastened to the chassis frame 3 leads to a corresponding alteration of the axle spacing between the axles 20 and 22.

The locked end position of the piston 30 may be readjusted at each beginning of a work shift, or may also be maintained for several operating days if no unusual lengthening of the chain can be detected.

Such lengthening of the chain could be detected, for instance, by observing the slack of the upper strand 15 of the chain 12.

In accordance with a preferred embodiment, it is provided that the cylinders 29 of the adjustment devices 18 of the crawler track units 6 are interconnected in order to enable communication among the adjustment devices 18. This enables uniform wear to be achieved on the chains 12 of all crawler track units 6.

Connecting all cylinders 29 of the crawler track units 6 in parallel causes an accumulator effect.

Figure 3:
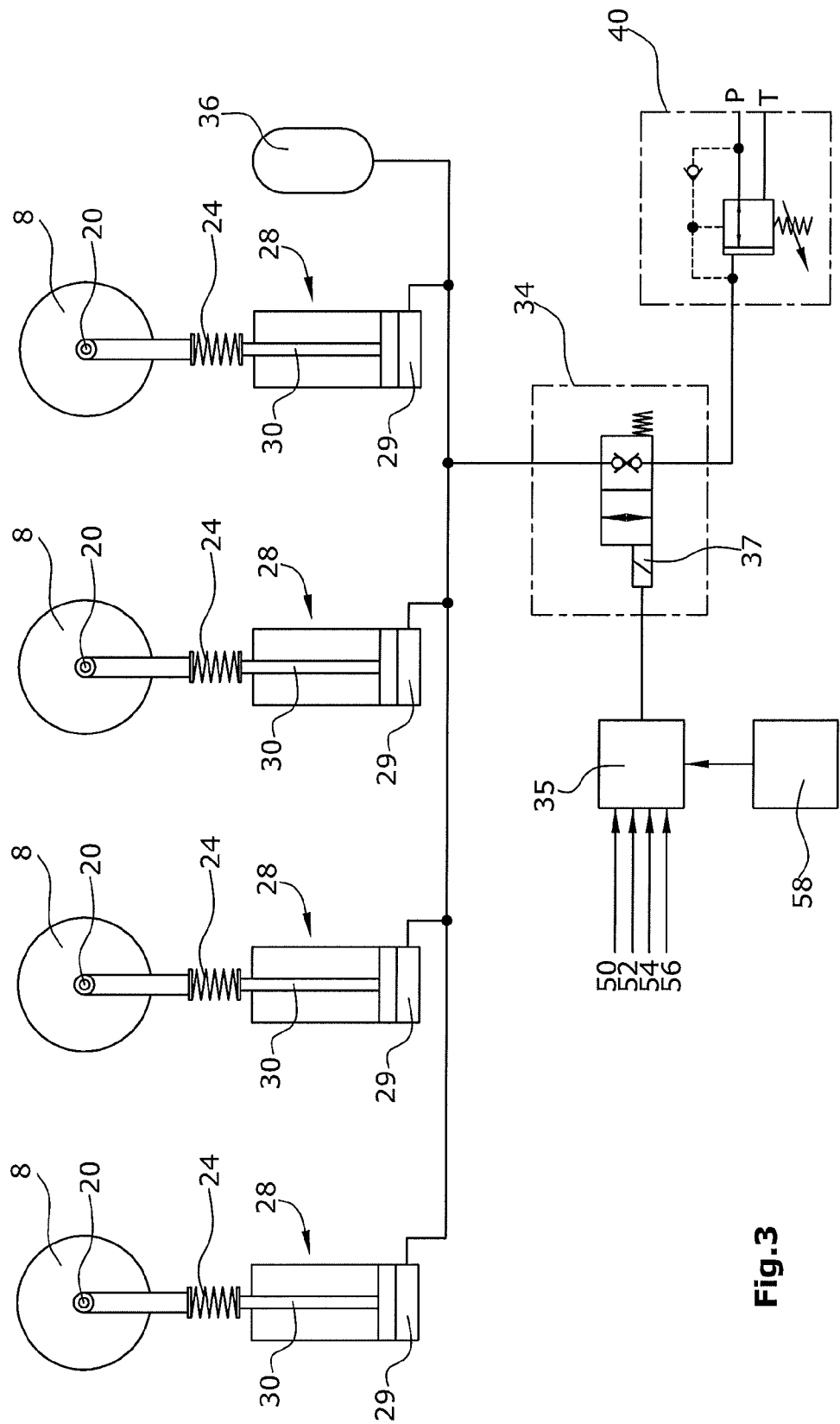

As can be inferred from FIG. 3, a pressure accumulator 36 can additionally be connected in parallel which functions as an additional accumulator. The pressure accumulator 36 enables the operating pressure in the cylinders 29 to slightly vary dynamically. Any pressure peaks can be counterbalanced in a flexible fashion.

Alternatively, each cylinder 29 is connected separately and may be provided with an own pressure accumulator.

As shown in FIG. 3, to tension one or more chains 12, a predetermined and selectable operating pressure, e.g., 30 bar, is provided from the hydraulic circuit of the tracked vehicle 1 via a pressure-limiting valve 40 to pressurize the cylinder 29 of the piston-cylinder units 28. Pressurized hydraulic fluid from the hydraulic circuit is supplied to pressure-limiting valve 40 at "pressure" port "P", and fluid is returned to the tank or reservoir of the hydraulic circuit via "tank" port "T". The pressure port "P" may communicate with a hydraulic pressure source. The operating pressure is fed to the respective cylinders 29 through a locking device 34, where the locking device 34, which comprises a 2/2-way directional valve, locks the end position of the pressurized piston or pistons 30 reached by means of non-return valves. Locking is effected when the force of the piston 30, which acts as a result of the operating pressure, is in balance with the counterforce between the axles 20,22 of the drive wheel and guide wheel 8,10 or between the guide wheel 8 and the chassis frame 3 respectively, which acts as a result of the chain tension, or after a preset time lapse of the applied force of the adjustment device 18. It is understood that the operating pressure applied is adapted to the desired chain tension, or to the desired slack of the chain 12 in the upper strand 15 respectively, and that the pressure-limiting valve 40 is adjusted accordingly.

Reaching of the end position of the piston 30 may be monitored using suitable sensors or may be controlled by means of a timing element which actuates the locking device 34.

The sensors 50, 52, 54, 56, for instance, enable measuring of the pressure, or the change in pressure respectively, in the cylinder 29. The force of the piston 30 or the displacement of the same may also be measured to detect when the piston 30 comes to a standstill in order to actuate the locking device 34, for instance, in an automatic process. Finally, a distance meter can be used to measure the distance between the upper strand 15 and the chassis frame 3 in order to detect whether a desired slack has been reached. Capacitive, inductive sensors or ultrasonic sensors may be used in the process.

Following application of the operating pressure by means of opening the locking valve 34, closing of the locking valve 34 may alternatively be initiated automatically by means of an adjustable or adjusted time delay of a time delay circuit 58.

The locking valve 34 is provided with a solenoid magnet 37 which switches the valve between the locked position and the open position. To this effect, the solenoid magnet 37 may be actuated by a controller 35, which may alternatively receive the control signals from different sensors. A distance sensor 50 may detect the slack of the upper strand 15 vis-à-vis the chassis frame 3. A pressure sensor 52 may detect the pressure or the change in pressure in the cylinder 29. A force sensor 54 may measure the piston force, and a displacement sensor 56 may measure the position of the piston 30 or its standstill respectively.

Where appropriate, the controller 35 may also use a combination of the proposed sensors to control the solenoid magnet 37.

If a pressure accumulator 36 is connected in parallel, it is also prestressed with the desired operating pressure. Operation of the adjustment devices 18 is preferably effected when the road construction machine 1 is on even, horizontal ground.

It is of advantage if the road construction machine 1 has moved forward in straight-ahead travel for a distance of some meters to some ten meters, e.g. 30 m, before initiating the chain tensioning operation.

The invention claimed is:

1. A road construction machine, comprising:
    a machine frame;
    two front crawler track units and two rear crawler track units supporting the machine frame, each crawler track unit including:
        a guide wheel having a guide wheel axis;
        a drive wheel having a drive wheel axis;
        a continuous chain extending around the guide wheel and the drive wheel;
        at least one track roller which rolls on the chain; and
        an adjustment device including a piston-cylinder unit, the piston-cylinder unit including a piston to which a hydraulic adjusting pressure can be applied to generate a piston force acting on at least one of the guide wheel and the drive wheel to adjust an axis spacing between the guide wheel axis and the drive wheel axis;
    a hydraulic pressure source;
    a central pressure limiting valve communicated with the hydraulic pressure source;
    a hydraulic supply line communicating the central pressure limiting valve with the piston-cylinder units of all four of the crawler track units so that an equal hydraulic adjusting pressure is applied to all four of the piston-cylinder units; and
    a common pressure accumulator separate from the hydraulic pressure source, the pressure accumulator being communicated with all four of the piston-cylinder units.

2. The road construction machine of claim 1, wherein:
    the pressure accumulator is communicated with the hydraulic supply line, so that the pressure accumulator is subjected to the same hydraulic adjusting pressure as the piston-cylinder units.

3. The road construction machine of claim 1, further comprising:
    a sensor operatively associated with the piston of at least one of the piston-cylinder units to detect when the piston comes to a standstill relative to the cylinder after application of hydraulic adjusting pressure to the piston; and
    a controller operatively associated with the sensor, the controller operable to maintain pressure communication between the central pressure limiting valve and the piston-cylinder units until detection that the piston of the at least one of the piston-cylinder units is at standstill.

4. The road construction machine of claim 3, wherein:
    the sensor includes a pressure sensor configured to detect a pressure or a change in pressure in the at least one of the piston-cylinder units.

5. The road construction machine of claim 3, wherein:
    the sensor includes a force sensor configured to detect a piston force acting on the at least one of the guide wheel and the drive wheel of the at least one of the piston-cylinder units.

6. The road construction machine of claim 3, wherein:
    the sensor includes a displacement sensor configured to detect a position of the piston of the at least one of the piston-cylinder units.

7. The road construction machine of claim 1, further comprising:
    a controller operable to maintain pressure communication between the central pressure limiting valve and the piston-cylinder units until a predetermined lapse of time after initial application of hydraulic adjusting pressure to the pistons of the piston-cylinder units.

8. The road construction machine of claim 1, further comprising:
    a controller operable to maintain pressure communication between the central pressure limiting valve and the piston-cylinder units until a counterforce between the axles of the drive wheel and guide wheel equals the piston force acting on the drive wheel and guide wheel of at least one of the piston-cylinder units.

9. The road construction machine of claim 1, further comprising:
    a distance sensor operatively associated with the chain of at least one of the crawler track units for detecting slack in an upper strand of the chain; and
    a controller operatively associated with the sensor, the controller operable to maintain pressure communication between the central pressure limiting valve and the piston-cylinder units until after detection of a predetermined slack in the upper strand of the chain.

10. A method of operating a road construction machine including two front crawler track units and two rear crawler track units supporting a machine frame, each crawler track unit including:
    a guide wheel having a guide wheel axis;
    a drive wheel having a drive wheel axis;
    a continuous chain extending around the guide wheel and the drive wheel;
    at least one track roller which rolls on the chain; and
    an adjustment device including a piston-cylinder unit, the piston-cylinder unit including a piston to which a hydraulic adjusting pressure can be applied to generate a piston force acting on at least one of the guide wheel and the drive wheel to adjust an axis spacing between the guide wheel axis and the drive wheel axis;
    wherein the method comprises:
    (a) simultaneously applying a hydraulic adjusting pressure from a common hydraulic pressure source with a central pressure limiting valve to all four of the piston-cylinder units to adjust an axis spacing between the guide wheel axis and the drive wheel axis of each of the crawler track units; and
    (b) isolating the piston-cylinder units from the common hydraulic pressure source prior to engaging the crawler track units to drive the road construction machine.

11. The method of claim 10, wherein:
    in step (a) the hydraulic adjusting pressure is applied to the four piston-cylinder units until a piston of at least one of the piston-cylinder units comes to a standstill.

12. The method of claim 10, wherein:
    in step (a) the hydraulic adjusting pressure is applied to the four piston-cylinder units until a predetermined lapse of time after initial application of hydraulic adjusting pressure to the piston-cylinder units.

13. The method of claim 10, wherein:

step (a) further comprises detecting a slack in an upper strand of the chain of at least one of the crawler-track units, and wherein the hydraulic adjusting pressure is applied to the four piston-cylinder units until after detection of a predetermined slack in the upper strand of the chain.

14. The method of claim 10, further comprising:

communicating all four of the piston-cylinder units with a common pressure accumulator.

15. The method of claim 14, wherein:

the communicating step further comprises communicating the pressure accumulator with a supply line communicating the common hydraulic pressure source with the four piston-cylinder units.

16. The method of claim 10, wherein:

step (a) is automatically performed during a break in operation of the construction machine.

17. The method of claim 10, wherein:

step (a) is automatically performed at each initial start in operation of the construction machine.

18. The method of claim 10, wherein:

step (a) is automatically performed after a time interval.

19. The method of claim 10, further comprising:

maintaining the four piston-cylinder units in communication with each other during operation of the construction machine so that a pressure peak in one piston-cylinder unit can be compensated, at least partially, by the other three piston-cylinder units.

\* \* \* \* \*